O. H. SEILTZ.
CHECKREIN SUPPORT.
APPLICATION FILED JAN. 9, 1912.

1,040,787.

Patented Oct. 8, 1912.

Witnesses
M. P. Williamson
W. H. LoRee

Inventor
Otto Seiltz
By W. W. Williamson
Attorney

UNITED STATES PATENT OFFICE.

OTTO H. SEILTZ, OF GREEN BAY, WISCONSIN.

CHECKREIN-SUPPORT.

1,040,787.  Specification of Letters Patent.  Patented Oct. 8, 1912.

Application filed January 9, 1912. Serial No. 670,229.

*To all whom it may concern:*

Be it known that I, OTTO H. SEILTZ, a citizen of the United States, residing at Green Bay, in the county of Brown and State of Wisconsin have invented a certain new and useful Improvement in Checkrein-Supports, of which the following is a specification.

My invention relates to new and useful improvements in check rein supports, and has for its object to provide an exceedingly simple and effective device of this character, whereby the check rein of a horse will be readily and quickly released should the animal stumble, or it may be released to permit the animal to drink.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1:
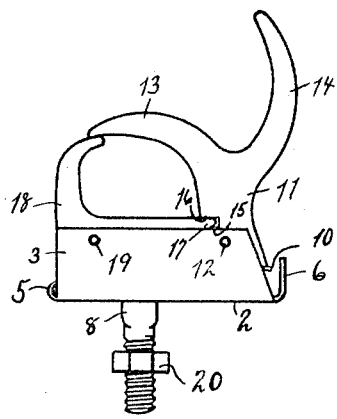
Figure 2:
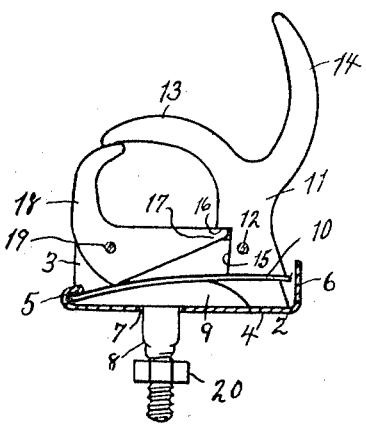

Figure 1, is a side elevation of my improved check rein support, showing the hook closed. Fig. 2, a similar view, showing the casing in section, and Fig. 3, also a side elevation, showing the hook open.

In carrying out my invention as here embodied, 2 represents the casing preferably formed from a single piece of metal bent up to produce the sides 3, the bottom 4, and the ends 5 and 6. In the bottom 4, is formed an opening 7, through which passes the bolt 8, having a head 9, which is situated within the casing and acts as a backing element for the flat spring 10, said spring engaging the head 9, throughout the major portion thereof, having its ends firmly held in position by the end 5 of the casing which end is bent over to lie upon the spring 10, as plainly shown in Fig. 2.

The free end of the spring 10, underlies the guard hook 11, which is pivoted between the side walls of the casing by a rivet or other suitable pivot member 12. The guard hook 11, is provided with two diverging arms, one of them projecting forwardly which I will call the inclosing arm 13, the other being the operating arm 14. A portion of the lower end of the guard hook is cut away as at 15 to form a shoulder 16, which when the device is in place, normally overlies and engages the nose 17 of the check rein hook 18, which is pivoted between the side walls of the casing adjacent the forward end of the casing by means of a rivet or other suitable pivoting element 19. The check rein hook is so constructed that when the device is closed, its outer end will overlie the end of the inclosing arm 13. The check rein hook is placed upon the harness in the same manner as any ordinary check rein support now in use, by passing the bolt 8 through the saddle of the harness and threading on said bolt the nut 20.

Figure 3:
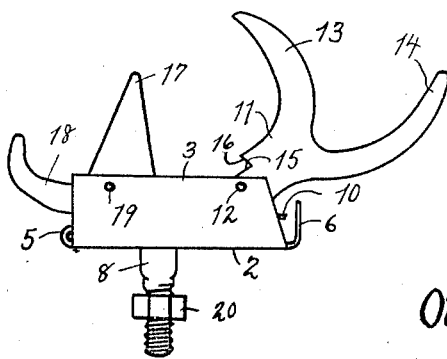

In practice, the support is opened as shown in Fig. 3, and the check rein passed over the check rein hook 18, after which said hook is closed and the guard hook then closed upon said check rein hook until the shoulder 16 engages the nose 17, and the inclosing arm 13 overlies the end of the check rein hook 18, and when in this position, the action of the flat spring 10 upon the heel of the guard hook will cause said guard hook to hold the check rein hook in place.

When it is desired to uncheck the horse's head, the guard hook 11 is opened in any suitable manner such as the pulling of a cord fastened to the operating arm 14, which is within easy access of the driver, or by throwing the line over the operating arm and giving it a quick pull. When said guard hook has been pulled open, the nose 17 is released from the shoulder 16, permitting the check rein hook 18 to be opened by a pull thereon from the horse's head.

It will be noticed that this device is especially useful for persons driving a scary horse, when it is found necessary to water said horse in proximity to railroad tracks, trolley cars, or other objects which might scare it, without it being necessary for the driver to release his hold upon the reins.

Of course I do not wish to be limited to the exact details of construction as here shown, as these may be varied within the limits of the appended claims without departing from the spirit of my invention.

Having thus fully described my invention, what I claim as new and useful, is—

1. In a check rein support, a casing, means carried by said casing for securing it in place, a check rein hook pivoted within the casing at the front end thereof, the nose of said hook extending rearwardly, a guard hook pivoted within the casing at the rear end thereof, said hook having a portion cut away to form a shoulder, said shoulder adapted to co-act with the nose of the check rein hook to normally hold the latter closed, and resilient means for normally holding the guard hook closed.

2. In a check rein support, a casing, means carried by said casing for securing it in place, a check rein hook pivoted within the casing at the front end thereof, the nose of said hook extending rearwardly, a guard hook pivoted within the casing at the rear end thereof, said hook having a portion cut away to form a shoulder, said shoulder adapted to co-act with the nose of the check rein hook to normally hold the latter closed, an inclosing arm formed with the guard hook, coacting with the check rein hook to hold the check rein in place, an operating arm also formed with the guard hook, whereby said guard hook may be manipulated.

3. In a check rein support, a casing comprising a bottom having an opening therein, side and end walls, the forward end wall being bent inward forming a fastener; a bolt passing through the opening in the bottom, the head thereof being situated within the casing, a flat spring, one end of which is permanently held in place beneath the front end wall, said spring projecting rearwardly and resting upon the head of the bolt, a check rein hook having a rearwardly projecting nose, means for pivoting said hook between the side walls of the casing, a guard hook having two diverging arms, one projecting upwardly and one projecting forwardly; said guard hook having a portion thereof cut away to form a shoulder in proximity to its lower end, said shoulder coacting with the nose of the check rein hook to normally hold the latter closed, the heel of the guard hook coacting with the flat spring whereby said guard hook is normally held in place, means for pivoting said guard hook between the side walls of the casing, and a nut threaded upon the bolt for holding the support in place.

In testimony whereof, I have hereunto affixed my signature in the presence of two subscribing witnesses.

OTTO H. SEILTZ.

Witnesses:
 FRIEDRICH SEILTZ,
 PHELIS NOEL.

---

Copies of this patent may be obtained for five cents each, by addressing the "Commissioner of Patents, Washington, D. C."